US008059729B2

(12) United States Patent
Zhidkov

(10) Patent No.: US 8,059,729 B2
(45) Date of Patent: Nov. 15, 2011

(54) METHOD AND APPARATUS FOR TRANSMITTING AND RECEIVING DATA IN A MULTI-CHANNEL DIGITAL BROADCASTING SYSTEM

(75) Inventor: Sergey Zhidkov, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1226 days.

(21) Appl. No.: 11/733,502

(22) Filed: Apr. 10, 2007

(65) Prior Publication Data

US 2008/0002783 A1 Jan. 3, 2008

(30) Foreign Application Priority Data

Jun. 29, 2006 (KR) ........................ 10-2006-0059361

(51) Int. Cl.
*H04K 1/10* (2006.01)
*H04L 27/00* (2006.01)

(52) U.S. Cl. .......................... 375/260; 375/259; 375/295

(58) Field of Classification Search .................. 375/260, 375/295, 259
See application file for complete search history.

(56) References Cited

U.S. PATENT DOCUMENTS 5,875,178 A 2/1999 Rahuel et al.
2002/0114401 A1* 8/2002 Kim et al. ..................... 375/262
2003/0185181 A1* 10/2003 Balachandran et al. ....... 370/337
2004/0010743 A1* 1/2004 Lee et al. ...................... 714/748
2006/0248563 A1* 11/2006 Lee et al. ...................... 725/117
2007/0091885 A1* 4/2007 Yu et al. ........................ 370/389
2007/0168842 A1* 7/2007 Jeong et al. .................. 714/786

FOREIGN PATENT DOCUMENTS

EP 1 592 180 11/2005
GB 2408433 5/2005
KR 10-0474404 8/2005
KR 1020060072574 6/2006
WO WO 2005062473 A1 * 7/2005
WO 1592160 11/2005

OTHER PUBLICATIONS

European Telecommunications Standards Institute (ETSI)/ European Broadcasting Union (EBU), "Radio broadcasting systems; Digital Audio Broadcasting (DAB) to mobile, portable and fixed receivers", Radio Broadcasting SYstems; Digital Audio Broadcasting (DAB) to Mobile, portable and fixed receivers. ETS 300 401 (Feb. 1995), Geneva: EBU, CH 1 Jan. 1995 pp. 141-149.
European Search Report dated Sep. 12, 2008 for corresponding Appln. 070120726.3-1224 / 1873941.
Abstract of Publication No. DE19606609 for corresponding application No. KR 10-0474404.
Abstract of Publication No. DE19606609 for corresponding application No. KR 10-0474404, Sep. 18, 1997.

* cited by examiner

*Primary Examiner* — Dac Ha
*Assistant Examiner* — Brian J Stevens
(74) *Attorney, Agent, or Firm* — F. Chau & Associates, LLC

(57) ABSTRACT

An apparatus and method for transmitting and receiving data for a multi-channel digital broadcasting system, using advanced encoding schemes (including sub channels having a regular part and a parity part) but also compatible with the existing digital broadcasting systems. In the transmitting apparatus, a main service channel includes a plurality of sub channels, and at least one of the sub channels contains a regular part generated based on the information data and a parity part corresponding to the regular part.

14 Claims, 8 Drawing Sheets

METHOD AND APPARATUS FOR TRANSMITTING AND RECEIVING DATA IN A MULTI-CHANNEL DIGITAL BROADCASTING SYSTEM

This application claims priority, under 35 U.S.C. §119, of Korean Patent Application No. 10-2006-0059361, filed on 29 Jun. 2006, the entirety of which is hereby incorporated by reference.

BACKGROUND OF THE INVENTION

1. Field of the Invention

The present invention relates to a digital broadcast system, and more particularly, to a method and apparatus capable of transmitting and receiving data in an improved multi-channel digital broadcasting system while also compatible with existing digital broadcasting systems.

2. Description of the Related Art

In recent years, advanced communication techniques have been introduced to solve noise problems by using advanced encoding schemes that achieve near-Shannon capacity performance. The advanced encoding schemes include parallel concatenated convolutional codes (PCCC), serially concatenated convolutional codes (SCCC), low-density parity check codes (LDPC), etc.

However, many of the contemporary digital broadcasting systems and their corresponding receivers in use today were developed or standardized before the discovery of the advanced encoding schemes. The digital audio broadcast (DAB) system, also known as Eureka-147 project, is an example of the digital broadcasting systems that were developed in the late 1980s and are now widely used worldwide.

FIG. 1 is a block diagram of a transmitting apparatus for a conventional multi-channel digital broadcasting system. Referring to FIG. 1, the apparatus includes a control channel generating unit 10, a main service channel (MSC) generating unit 20, an MSC multiplexer 30, a transmission frame multiplexer 40, a fast information channel (FIC) and MSC symbol generator 50, and an orthogonal frequency division multiplexed (OFDM) signal generator 60.

The control channel generating unit 10 includes a fast information block (FIB) assembler 11, a scrambler 13, and a convolutional encoder 15 in order to generate an FIC containing information regarding a main service channel, based on control data.

The MSC generating unit 20 includes a plurality of sub channel blocks 20-1 through 20-N that generate a plurality of sub channels based on information data. Each of the sub channel blocks (20-1 through 20-N) includes a scrambler 21-1 through 21-N) that scrambles received data, a non-systematic non-recursive convolutional (NSC) encoder (23-1 through 23-N) that encodes the data received from the scrambler (21-1 through 21-N), a puncturing unit (25-1 through 25-N) that punctures the data received from the NSC encoder (23-1 through 23-N), and a time-interleaver (27-1 through 27-N) that performs time-interleaving on the data received from the puncturing unit (25-1 through 25-N).

The MSC multiplexer 30 multiplexes the data received via the sub channel blocks 20-1 through 20-N of the MSC generating unit 20, and outputs the multiplexed result.

The transmission frame multiplexer 40 generates a transmission frame based on the multiplexed result received from the MSC multiplexer 30 and a signal received from the control channel generating unit 10 and outputs the transmission frame.

The FIC and MSC symbol generator 50 generates FIC and MSC data symbols for the transmission frame received from the transmission frame multiplexer 40.

The OFDM signal generator 60 generates an OFDM signal from the data received from the FIC and MSC symbol generator 50 and data received from a synchronization channel symbol generator (not shown).

FIG. 2 is a diagram illustrating a data structure of a transmission frame for a conventional multi-channel digital broadcasting system. Referring to FIG. 2, a transmitting apparatus for the conventional digital broadcasting system, combines three channels to generate a transmission frame and transmits the transmission frame. The transmission frame includes a synchronization channel 110, an FIG. 120, and an MSC 130. The MSC 130 includes a plurality (N) of N sub channels 130-1 through 130-N.

The synchronization channel 110 contains information needed to perform basic demodulator functions, such as transmission frame synchronization, automatic frequency control, channel state estimation, and transmitter identification.

The FIC 120 contains plural pieces of information that a receiving apparatus (not shown) must rapidly access, and particularly, multiplexing configuration information.

The MSC 130 transmits components for audio, video, or data services. The MSC 130 includes a plurality (N) of sub channels 130-1 through 130-N that are individually (independently) convolutionally encoded and time-interleaved.

A transmitting apparatus, such as that shown in FIG. 1, for a conventional multi-channel digital broadcasting system, uses conventional encoding schemes. Thus, in order to realize a transmitting apparatus, for a multi-channel digital broadcasting system, using advanced encoding schemes, e.g., serially concatenated convolutional codes (SCCC), an encoder using SCCC must be included into the system of FIG. 1. However, in this case, a receiving apparatus designed for a conventional multi-channel digital broadcasting system using conventional encoding schemes must be replaced with a receiving apparatus that includes a decoder using SCCC, thereby making new broadcasting system incompatible with existing receiving equipment.

SUMMARY OF THE INVENTION

Embodiments of the present invention provide a digital broadcasting system and a method that employs an advanced encoding scheme (including sub channels carrying a regular part and a parity part) but is also compatible with the existing digital broadcasting systems particularly the conventional receivers thereof.

An aspect of the present invention provides a transmitting apparatus for a multi-channel digital broadcasting system, the apparatus including a main service channel (MSC) generating unit that generates a plurality of sub channels based on information data, and a control channel generating unit that generates a fast information channel (FIC) containing information regarding the main service channel, based on control data. At least one of the sub channels includes a regular part generated based on the information data and a parity part corresponding to the regular part.

The MSC generating unit may include a regular part block that generates the regular part, and a parity part block that generates parity data based on the information data and the parity part based on the parity data.

The regular part block may include a scrambler that scrambles the information data supplied to the regular part block a first encoder that receives and encodes the data from the scrambler, a first puncturing unit that punctures the data from the first encoder, and a first interleaver that interleaves the data from the first puncturing unit.

The parity part block may include a second interleaver that interleaves the data from the first encoder, a second encoder that receives and encodes the data from the second interleaver and outputs the parity data, and a third interleaver that interleaves the data from the second encoder.

The parity part block may further include a second puncturing unit that receives and punctures the data from the first encoder and outputs the puncturing result to the second interleaver, and a third puncturing unit that receives and punctures the data from the second encoder and outputs the puncturing result to the third interleaver.

The first encoder may be a non-recursive non-systematic connvolutional (NSC) encoder, and the second encoder may be a recursive-systematic, convolutional (RSC) encoder.

The first and third interleavers may be convolutional-interleavers or block-interleavers, and the second interleaver may be a block-interleaver.

The second encoder may receive the data as input data from the second interleaver, encode the received data, and output systematic data and parity data. The parity part may be generated based on the parity data excluding the systematic data.

The digital broadcasting system may be a digital audio broadcasting (DAB) system or a digital multimedia broadcasting (DMB) system.

Another aspect of the present invention provides a receiving apparatus for a multi-channel digital broadcasting system including at least one of the sub channels having a regular part generated based on the information data and a parity part corresponding to the regular part. The receiving apparatus receives broadcast data from a transmitting apparatus that generates and transmits an main service channel (MSC) including a plurality of sub channels, at least one of the sub channels having a regular part generated based on information data and at least one parity part corresponding to the regular part. The receiving apparatus includes an MSC demultiplexer; a first interleaver that interleaves the regular part data received from the MSC demultiplexer and outputs the interleaved data; and a decoder that receives and decodes the parity part data from the MSC demultiplexer and the data from the first interleaver.

The receiving apparatus may further include a multiplexer that receives and multiplexes the regular part data from the first interleaver and the parity part data from the MSC demultiplexer, and outputs the multiplexed result to the decoder.

The decoder may consist essentially of a conventional decoder. The decoder may include: an inner decoder configured to receive and decode the data from the first interleaver, the parity part data from the MSC demultiplexer, and feedback data; a deinterleaver that receives and deinterleaves the data from the inner decoder and outputs the deinterleaved data; an outer decoder that receives and decodes the data from the deinterleaver and outputs the information data and code data; and a second interleaver that receives and interleaves the code data from the outer decoder and outputs the feedback data.

The first and second interleavers may be block interleavers, and the deinterleaver may be a block deinterleaver.

The inner decoder may be an inner soft-in-soft-out (SISO) decoder, and the outer decoder may be an outer soft-in-soft-out (SISO) decoder.

Another aspect of the present invention provides a method of transmitting data for a multi-channel digital broadcasting system, the method including generating an MSC including a plurality of sub channels, based on information data; generating an FIC containing information regarding the MSC based on control data; and multiplexing the sub channels and the FIC and transmitting the multiplexing result. At least one of the sub channels includes a regular part generated based on the information data and a parity part corresponding to the regular part.

The generation of the main service channel may include generating the regular part, and generating parity data based on the information data and the parity part based on the parity data.

The generation of the regular part may include scrambling the information data supplied to the regular part performing first encoding by receiving and encoding the scrambled data, performing first puncturing by puncturing the data encoded in the first encoding, and performing first interleaving by interleaving the data punctured in the first puncturing.

The generation of the parity part may include performing second interleaving by interleaving the data encoded in the first encoding performing second encoding by receiving and encoding the data interleaved in the second interleaving and outputting the parity data, and performing third interleaving by interleaving the data interleaved in the second interleaving.

The generation of the parity part may include performing second puncturing by receiving and puncturing the data encoded in the first encoding, and performing third puncturing by receiving and puncturing the data encoded in the second encoding.

Another aspect of the present invention provides a receiving method for a multi-channel digital broadcasting system a transmitting apparatus that generates and transmits an MSC including a regular part generated based on information data and at least one parity part corresponding to the regular part. The method generally includes receiving the regular part and parity part as input data. The method may include demultiplexing the input data and selectively outputting regular part data; performing first interleaving by interleaving the regular part data selected in the demultiplexing; and decoding by receiving and decoding the parity part data and regular part data.

The receiving method may further include receiving and multiplexing the parity part data and the regular part data, before performing the decoding.

The decoding may include inner decoding, deinterleaving data decoded in the inner decoding, performing outer decoding by decoding the data deintereaved in the deinterleaving, and generating information data and code data; and performing second interleaving by interleaving the code data generated in the outer decoding, and feeding back the interleaved code data to the inner decoding.

Hereinafter, exemplary embodiments of the present invention will be described in detail with reference to the accompanying drawings. Like reference numerals denote like elements throughout the drawings.

BRIEF DESCRIPTION OF THE DRAWINGS

The above and other features of the present invention will become more apparent to persons skilled in the art by describing in detail exemplary embodiments thereof with reference to the attached drawings in which.

DETAILED DESCRIPTION OF EXEMPLARY EMBODIMENTS OF THE INVENTION

Figure 3:
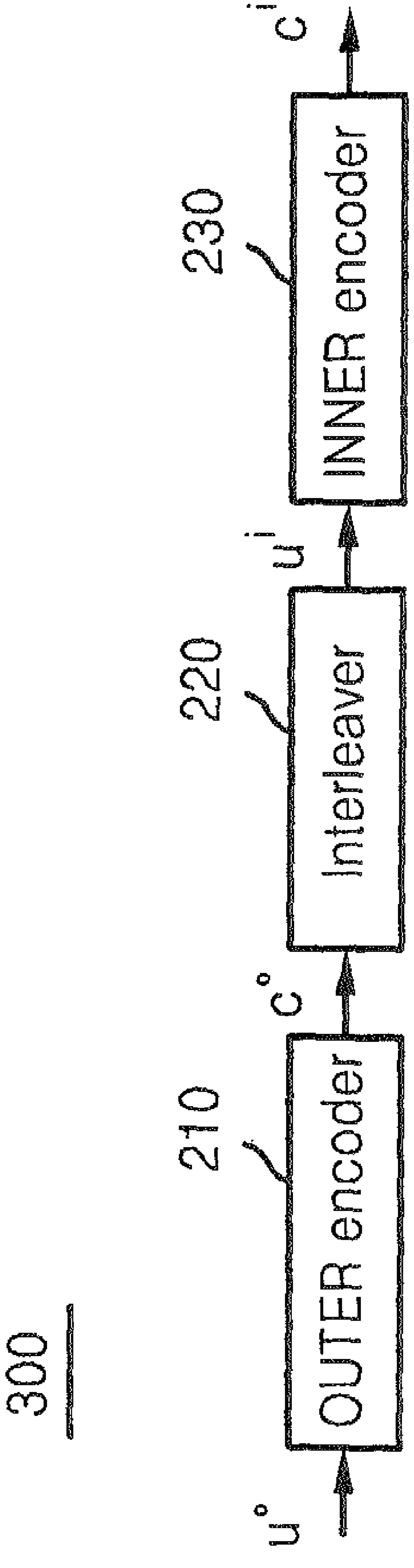
FIG. 3 is a block diagram of a serially concatenated convolutional encoder according to an embodiment of the invention for serially concatenated convolutional codes (SCCC)

FIG. 3 is a block diagram of a serially concatenated convolutional encoder for an advanced encoding scheme known as serially concatenated convolutional codes (SCCC). Referring to FIG. 3, the serially concatenated convolutional encoder ("the encoder") 300 includes an outer convolutional encoder 210, an inner convolutional encoder 230, and an interleaver 220 located between the outer convolutional encoder 210 and the inner convolutional encoder 230. The encoder 300 may further include puncturing units (not shown) that respectively perform puncturing on data received from the outer convolutional encoder 210 and data from the inner convolutional encoder 230, if necessary.

The outer convolutional encoder 210 encodes received source data $U^o$ and outputs encoded data $C^o$. The interleaver 220 interleaves the information of the received encoded data $C^o$, lowers the degree of the relationship (correlation) between one data and adjacent data in the encoded data $C^o$, and outputs interleaved data $U^i$. The inner convolutional encoder 230 encodes the interleaved data $U^i$ again, and finally outputs data $C^i$.

Figure 4:
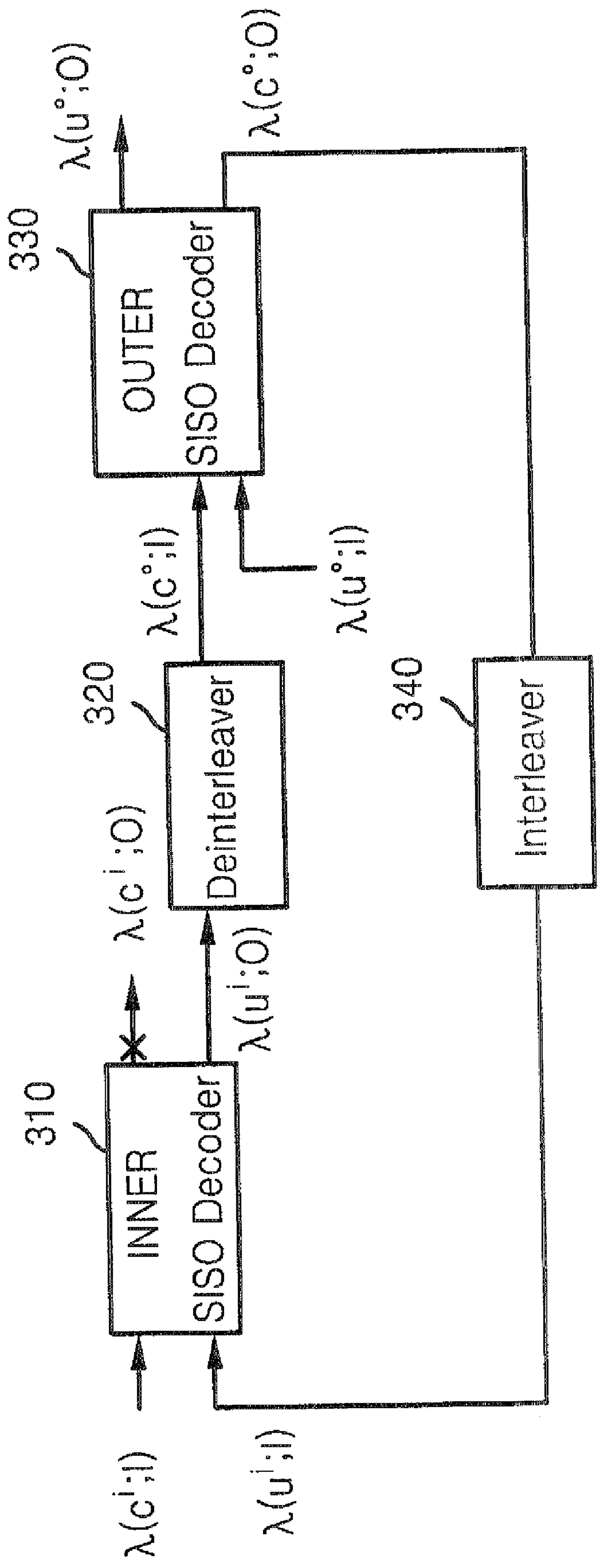
FIG. 4 is a block diagram of a serially concatenated convolution decoder for SCCC.

FIG. 4 is a block diagram of a serially concatenated convolution decoder 400 for serially concatenated convolutional codes (SCCC). The decoder 400 illustrated in FIG. 4 is disclosed in "Serial concatenation of interleaved codes: Design and performance analysis,", introduced by S. Benedetto, D. Divsalar G. Montorsi, and F. Pollara (IEEE Trans. Info. Theory, April 1998.).

Referring to FIGS. 3 and 4, an inner soft-input soft-output (SISO) decoder 310 receives a logarithmic likelihood ratio's (LLR's) $\lambda(c^i;I)$ of a code symbol output from the inner encoder 230. The second input $\lambda(u^i;I)$ of the SISO inner decoder 310 is set to zero during the first iteration.

The inner decoder 310 receives the LLR's $\lambda(c^i;I)$, and outputs an extrinsic LLR $\lambda(u^i;O)$ of an information symbol output from the inner encoder 230 by using the SISO algorithm. When the extrinsic LLR $\lambda(u^i;O)$ is supplied to the deinterleaver 320, an LLR $\lambda(c^o;I)$ of a code symbol of the outer encoder 210 is output from the deinterleaver 320.

The SISO outer decoder 330, in turn, processes the LLR's $\lambda(c^o;I)$ of its unconstrained code symbols, and computes the LLR's of both code and information symbols based on the code constraints. $\lambda(u^o;I)$ is a second input to the SISO outer decoder 330 is always set to 0.

The LLR $\lambda(u^o;O)$ of the information symbol is used in a last iteration in order to recover information bits. When the LLR $\lambda(c^o;O)$ of the code symbol is supplied to the interleaver 340, the interleaver 340 outputs the LLR $\lambda(u^i;I)$ and feeds it back to the lower (as shown in FIG. 4) input of the SISO inner decoder 310 to start the second iteration.

Figure 5A:
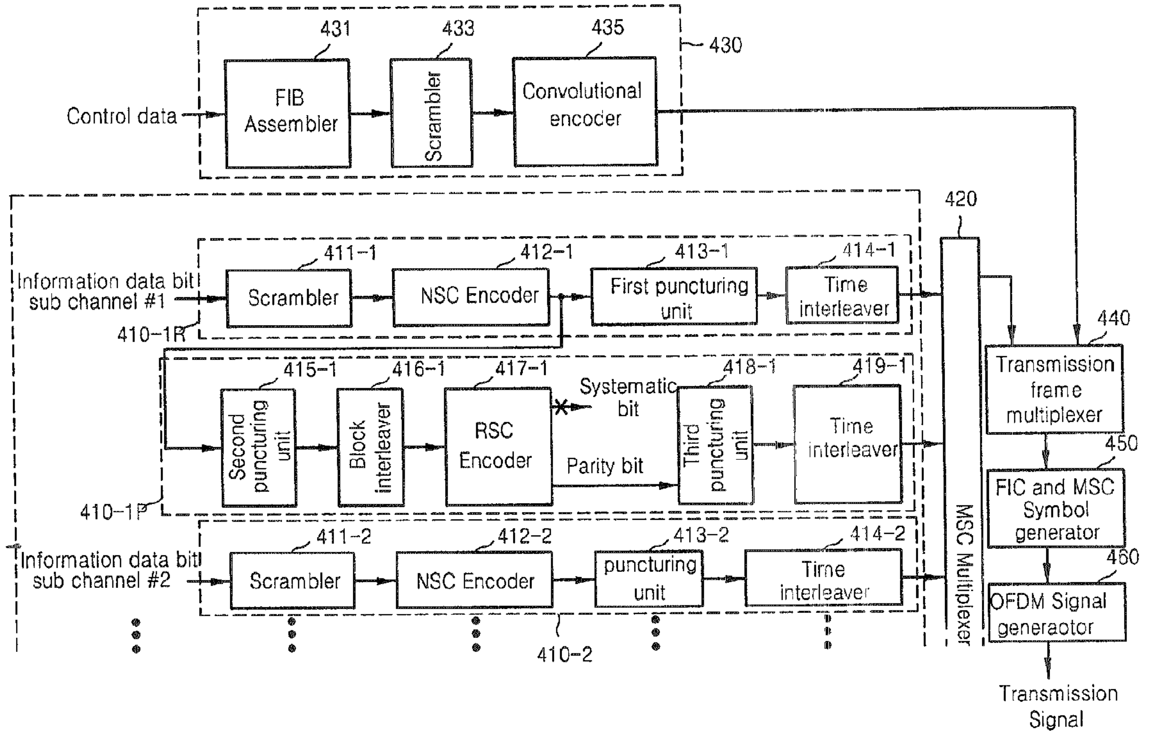
FIGS. 5A and 5B are together a block diagram of a transmitting apparatus for a multi-channel digital broadcasting system according to an embodiment of the present invention.
Figure 5B:
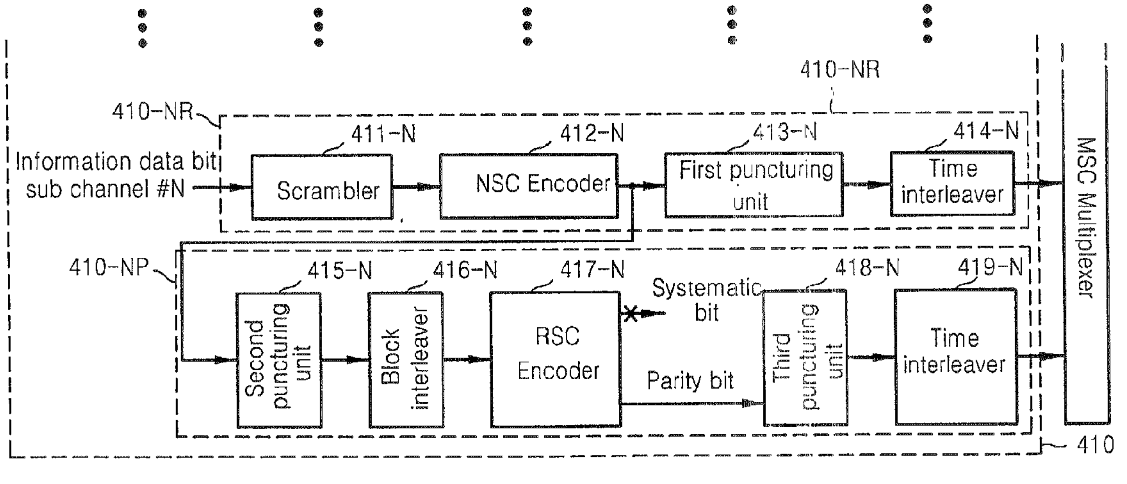

FIGS. 5A and 5B are together a block diagram of a transmitting apparatus for a multi-channel digital broadcasting system according to an embodiment of the present invention. Referring to FIGS. 5A and 5B, the transmitting apparatus includes a main service channel (MSG) generating unit 410, a control channel generating unit 430, an MSC multiplexer 420, a transmission frame multiplexer 440, a fast information channel (FIC) and main service channel (MSC) symbol generator 450, and an orthogonal frequency division multiplexed (OFDM) signal generator 460.

The main service channel (MSC) generating unit 410 generates a plurality of sub channels 410-1 through 410-N based on information data.

The control channel generating unit 430 generates a fast information channel (FIC) containing information regarding an MSC, based on control data.

Each of the least one of the sub channels 410-1 through 410-N, shown in FIGS. 5A and 5B, includes a regular (R) part generated based on the information data, and a parity (P) part corresponding to the regular part.

Sub channels, each containing the regular (R) part and the parity (P) part, are referred to as composite sub channels 410-1 and 410-N. A non-composite sub channel 410-2 that contains only a regular (R) part is referred to as a regular sub channel. The number of the composite sub channels is unlimited.

The MSC generating unit 410 includes regular part blocks 410-1R to 410-NR that generate the regular part and also includes parity part blocks 410-1P to 410-NP that generate parity data (based on the information data) and the parity part (based on the parity data).

The construction and operation of the regular part blocks (e.g., regular part block 410-1R) will now be described in greater detail. The first regular part block 410-1R may include a scrambler 411-1 that scrambles the information data supplied to the regular part block 410-1R, a first encoder 412-1 that receives and encodes the data output from the scrambler 411-1, a first puncturing unit 413-1 that performs puncturing on the data output from the first encoder 412-1, and a first interleaver 414-1 that interleaves the data output from the first puncturing unit 413-1.

Figure 1:
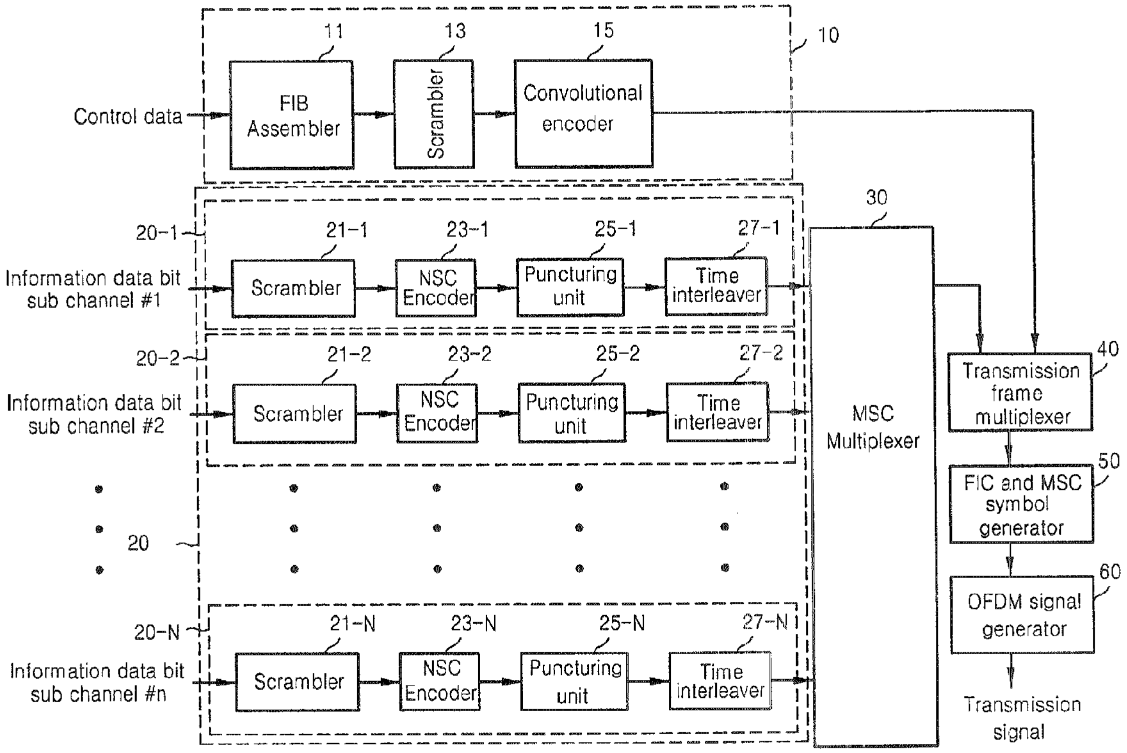
FIG. 1 is a block diagram of a transmitting apparatus for a conventional multi-channel digital broadcasting system.
Figure 2:
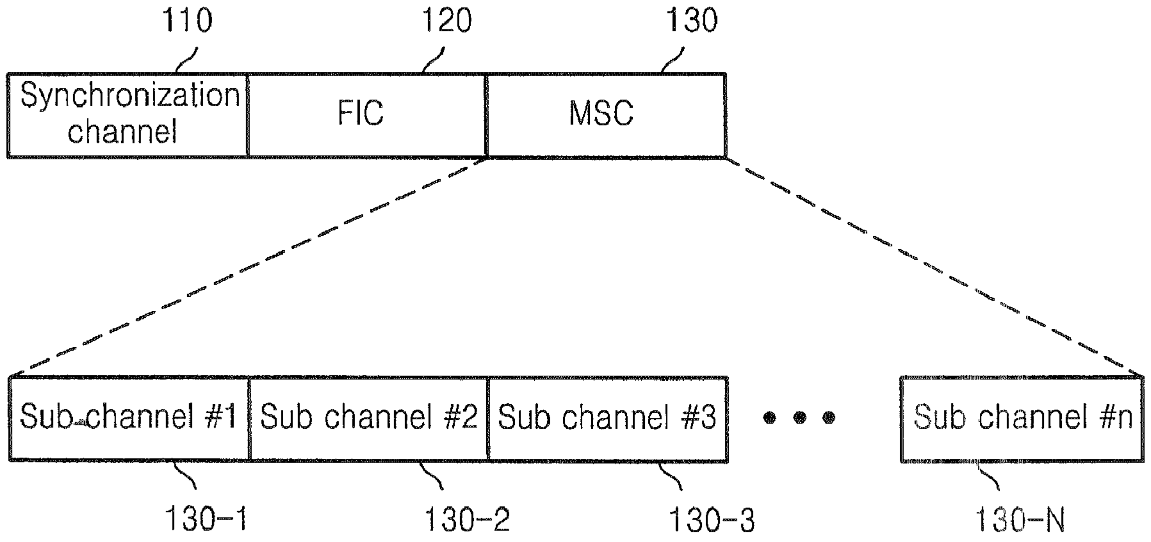
FIG. 2 is a diagram illustrating the structure of a transmission frame for a conventional multi-channel digital broadcasting system.

Thus, each regular part block is designed to have the same construction as a sub channel block, such as 20-1 shown in FIG. 1, so that a receiving apparatus for a conventional digital broadcasting system is compatible with the existing digital broadcasting systems. The last regular part block 410-NR is equivalent to the first regular part block 410-1R and a detailed description thereof will be omitted.

Each of the parity part blocks 410-1P and 410-N includes: a second interleaver (e.g., 416-1 and 416-N) that interleaves data from the first encoders 412-1 and 412-N; a second encoder (e.g., 417-1 and 417-N) that receives and encodes the data from the second interleaver (e.g., 416-1 and 416-N) and output the parity data; and a third interleaver (e.g., 419-1 and 419-N) that interleaves the data from the second encoders (e.g., 417-1 and 417-N).

When comparing the parity part blocks (410-1P and 410-NP) with the serially concatenated convolutional encoder illustrated in FIG. 3 the first encoders (e.g., 412-1 and 412-N) correspond to the outer encoder 210 of FIG. 3, the second interleavers (416-1 and 416-N) correspond to the interleaver 220 of FIG. 3, and the second encoders (417-1 and 417-N) correspond to the inner encoder 230 of FIG. 3. Thus, the parity part blocks 410-1P and 410-NP are capable of performing serially concatenated convolution decoder (SCCC), the advanced encoding scheme.

Each of the parity part blocks (410-1P and 410-NP) may further include: a second puncturing unit (e.g., 415-1 and 415-N) that receives and punctures the data from the first encoder (412-1 and 412-N) and outputs the puncturing result to the second interleaver (416-1 and 416-N); and third puncturing units 418-1 and 418-N that receives and punctures the data from the second encoder (417-1 and 417-N) and outputs the puncturing result to the third interleaver (419-1 and 419-N).

The first encoders (412-1 and 412-N) may be non-systematic, non-recursive convolutional (NSC) encoders, and the second encoders (417-1 and 417-N) may be recursive-systematic, convolutional (RSC) encoders. Alternatively, the first encoders (412-1 and 412-N) may be RSC encoders, but the second encoders (417-1 and 417-N) are preferably RSC encoders. If the second encoders (417-1 and 417-N) are RSC encoders they receive the data as input data from the second interleavers (416-1 and 416-N), encode the received data, and output systematic bits and parity bits. The systematic bits are equivalent to the input data supplied to the second encoders (417-1 and 417-N), and thus, the parity part blocks (410-1P and 410-NP) process only the parity bits and transmit the processed result. This is because information regarding the systematic bits is transmitted via the regular part blocks (410-1R and 410NR).

The first interleavers (414-1 and 414-N) and the third interleavers (419-1 and 419-N) may be convolutional-interleavers or block-interleavers, and the second interleavers (416-1 and 416-N) may be block-interleavers. The first interleavers (414-1 and 414-N) and the third interleavers (419-1 and 419-N) may process time-interleaving.

The control channel generating unit 430 includes a fast information block (FIB) assembler 431, a scrambler 433, and a convolutional encoder 435, and generates an FIC containing information regarding the MSC based on control data. The control channel generating unit 430 may be the same as the control channel generating unit 10 in FIG. 1.

The MSC multiplexer 420 multiplexes data received via the (R) and (P) sub channel blocks (410-1 through 410-N) of the MSC generating unit 410, and outputs the multiplexed result (the data selected from among the (R) and (P) sub channel blocks (410-1 through 410-N)).

The transmission frame multiplexer 40 generates and outputs a transmission frame based on a signal from the MSC multiplexer 420 and a signal from the control channel generating unit 430.

The FIC and MSC symbol generator 450 generates FIC and MSC data symbols of the transmission frame received from the transmission frame multiplexer 40.

The OFDM signal generator 460 generates an OFDM signal, based on the data received from the FIC and MSC symbol generator 450 and data received from a synchronization channel symbol generator (not shown).

The digital broadcasting system may be a digital audio broadcasting (DAB) system or a digital multimedia broadcasting (DMB) system.

Figure 6:
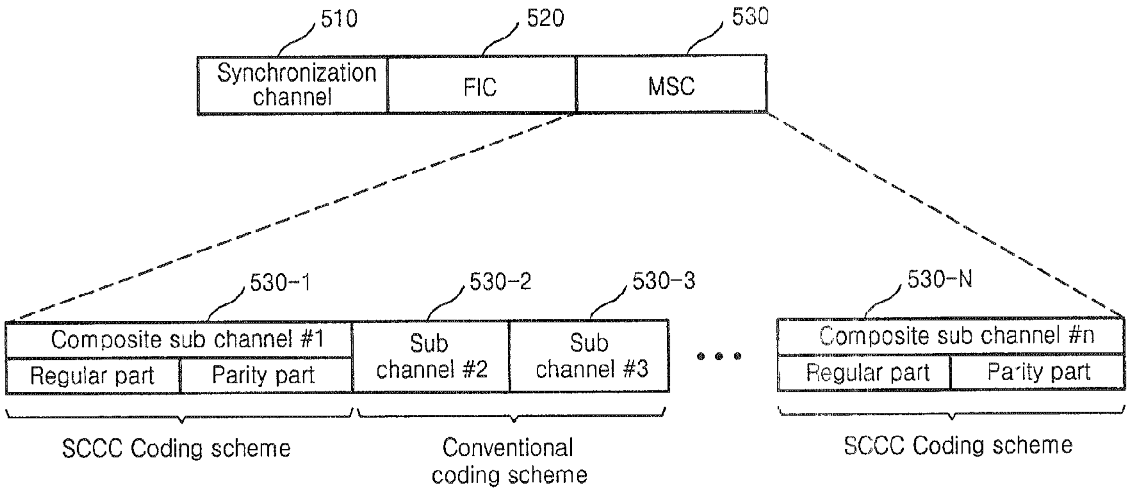
FIG. 6 is a diagram illustrating the structure of a transmission frame for a multi-channel digital broadcasting system according to an embodiment of the present invention.

FIG. 6 is a diagram illustrating the structure of a transmission frame for a multi-channel digital broadcasting system according to an embodiment of the present invention. Referring to FIG. 6, a transmitting apparatus for a multi-channel digital broadcasting system according to the present invention combines three channels to generate a transmission frame, and transmits the transmission frame. The transmission frame contains a synchronization channel 510, an FIC 520, and an MSC 530. The MSC 530 includes a plurality of sub channels 530-1 through 530-N, including at least one composite sub channel (e.g., 530-1 or 530-N).

Each of the composite sub channels 530-1 and 530-N includes a regular (R) part and a parity (P) part. The composite sub channels 530-1 and 530-N are encoded according to the SCCC coding scheme.

The synchronization channel 510 contains information needed to perform basic demodulator functions, such as transmission frame synchronization, automatic frequency control channel state estimation, and transmitter identification.

The FIC 520 contains plural pieces of information that a receiving apparatus must rapidly access, and particularly, multiplex configuration information. The FIC 520 may also contain information regarding the number or the locations of the composite sub channels 530-1 and 530-N.

The FIC 520 may contain information regarding the sub channels 530-1 and 530-N, each including the regular (R) part and the parity (P) part. Thus, the FIC 520 may contain information regarding the number and location of the sub channels (the composite sub channels) 530-1 and 530-N. The MSC 530 transmits components for audio, video, or data services. The sub channels 530-1 through 530-N in the MSG 530 are individually convolutionally encoded and time-interleaved.

Figure 9:
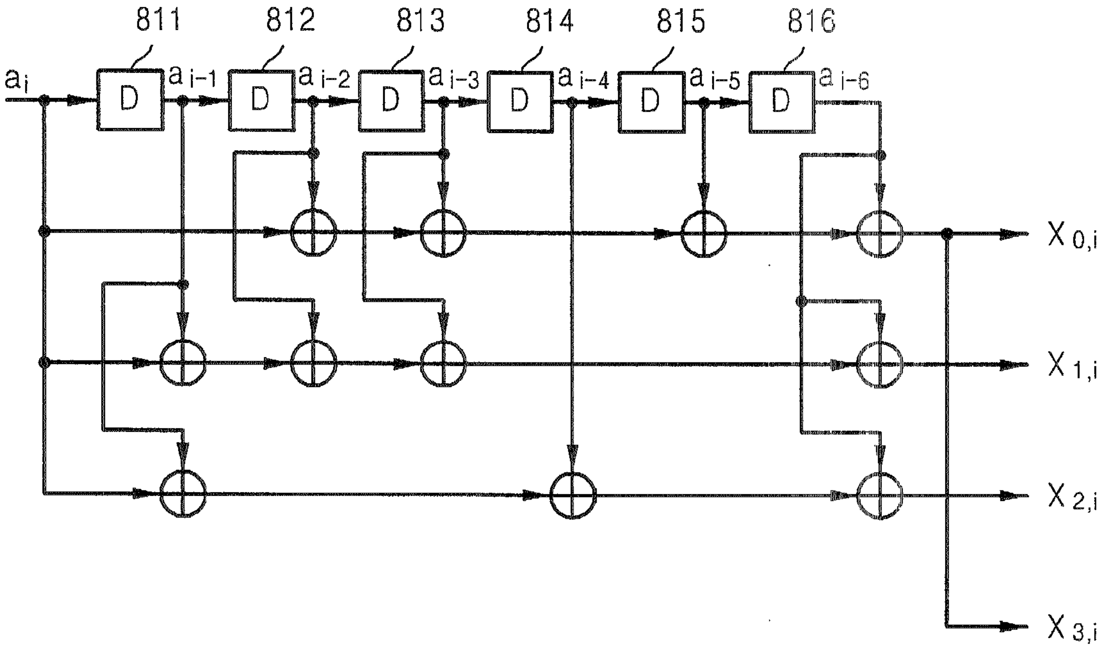
FIG. 9 is a circuit diagram of a convolutional encoder for a regular part of a transmitting apparatus for a multi-channel digital broadcasting system, according to an embodiment of the present invention.

FIG. 9 is a circuit diagram of a convolutional encoder, such as the encoder 412-*k* (e.g., 412-1) illustrated in FIGS. 5A and 5B, for a regular part of a transmitting apparatus for a multi-channel digital broadcasting system, according to an embodiment of the present invention (k is an integer from 1 to N). Referring to FIG. 9, the convolutional encoder includes first through sixth D flip-flops 811, 812, 813, 814, 815, and 816 that are serially connected to sequentially receive bit data and shift the bit data by one bit; and a plurality of XOR gates.

The convolutional encoder may perform an XOR operation on a bit $a_i$ received from the first D flip-flop 811. Bits $a_{i-2}$, $a_{i-3}$, $a_{i-5}$ and $a_{i-6}$ respectively received from the second, third, fifth and sixth D flip-flops 812, 813, 815, and 816. The convolutional encoder outputs first and fourth output signals $X_{0,i}$ to $X_{3,i}$; The convolutional encoder: performs the XOR operation on the bit at received from the first D flip-flop 811 and bits $a_{i-1}$, $a_{i-2}$, $a_{i-3}$, and $a_{i-6}$ (respectively received from the first second, third, and sixth D flip-flops 811, 812, 813, and 816), and outputs a second output signal $X_{1,i}$ and performs the XOR operation on the bit a received from the first D flip-flop 811 and bits $a_{i-1}$, $a_{i-4}$, and $a_{i-6}$ (respectively received from the first, fourth, and sixth D flip-flops 811, 814, and 816), and outputs a third output signal $X_{2,i}$.

The convolutional encoder for the regular (R) part must be compatible with the existing digital broadcasting systems, and is therefore designed to be the same as a conventional standard encoder (FIG. 1).

Figure 10:
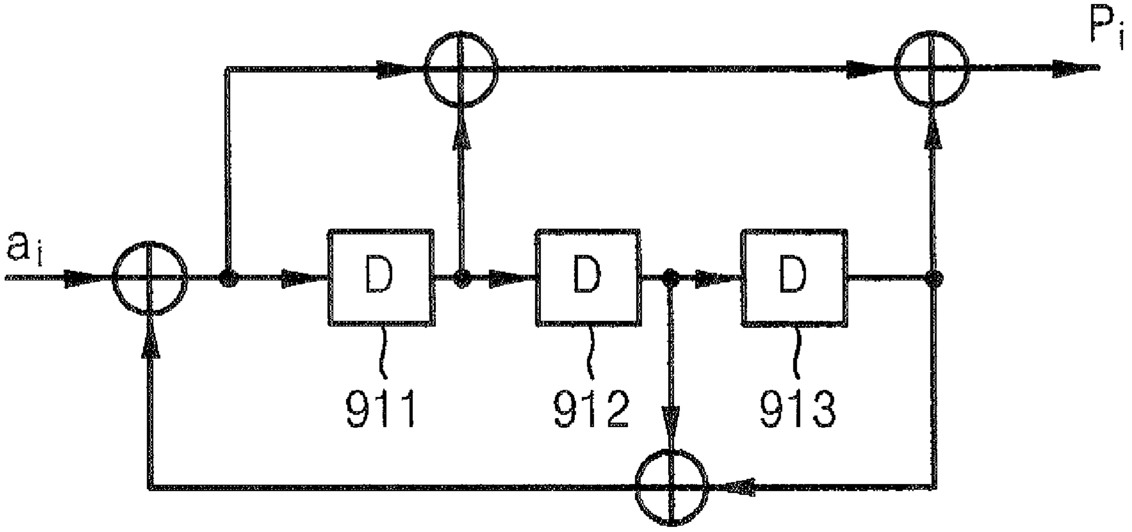
FIG. 10 is a circuit diagram of a convolutional encoder for a parity part of a transmitting apparatus for a multi-channel digital broadcasting system, according to an embodiment of the present invention.

FIG. 10 is a circuit diagram of a convolutional encoder, such as the encoders 417-1 and 417-N illustrated in FIG. 5A or 5B for a parity (P) part of a transmitting apparatus for a multi-channel digital broadcasting system, according to an embodiment of the present invention. Referring to FIG. 10, the convolutional encoder for the parity part, includes: first through third D flip-flops 911, 912, and 913 that are serially connected to sequentially receive bit data and shift the bit data by one bit; and a plurality of XOR gates.

A signal obtained by performing an XOR operation on an input bit $a_i$, and on bits output from the second and third D flip-flops 912 and 913, is supplied to the first D flip-flop 911. Bits output from the first and second D flip-flops 911 and 912 are respectively supplied to the second and third D flip-flops 912 and 913. The convolutional encoder, which is a recursive, systematic convolutional encoder, is capable of performing the XOR operation on a bit input to the first D flip-flop 911 and on bits output from the first and third D flip-flops 911 and 913, and outputs a parity bit $P_i$.

Figure 7:
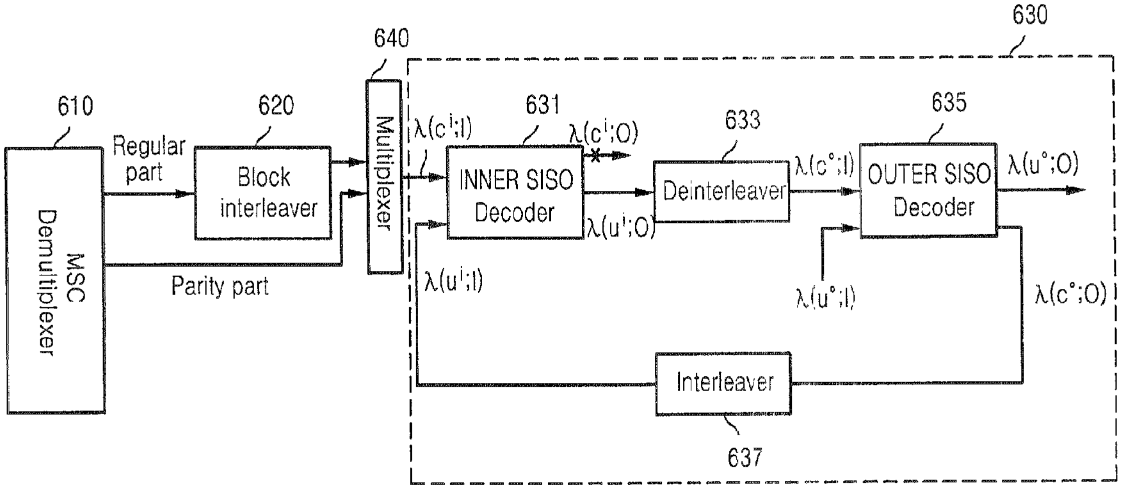
FIG. 7 is a block diagram of a receiving apparatus for a multi-channel digital broadcasting system according to an embodiment of the present invention.

FIG. 7 is a block diagram of a receiving apparatus for a multi-channel digital broadcasting system, according to an embodiment of the present invention. Referring to FIG. 7, the receiving apparatus includes an MSC demultiplexer 610, a first interleaver 620, and a decoder 630.

The receiving apparatus may further include a multiplexer 640 that receives and multiplexes one of data from the first interleaver 620 and data from the MSC demultiplexer 610 received via a parity part block, and supplies the multiplexed result to the decoder 630.

The MSC demultiplexer 610 receives data via an MSC that includes a plurality of sub channels, and selectively outputs the data transmitted via one sub channel of the MSC, based on one piece of the data received via an FIC. Thus, the MSC demultiplexer 610 may be a selector that selects one of the sub channels of the MSC that a user desires, and outputs data received via the selected sub channel.

The first interleaver 620 interleaves one piece of the data received from the demultiplexer 610 via a regular (R) part block and outputs the interleaved result to the decoder 630. Thus, a regular (R) part of a composite sub channel is interleaved by the first interleaver 620 and the interleaved result is input to the decoder 630, since the regular (R) part was not interleaved at a transmitting side by the interleaver corresponding to the interleaver 220 of FIG. 3, for example, as illustrated in FIGS. 5A and 5B.

The decoder 630 receives and decodes one (parity data) of the data from the first interleaver 620 and the data from the demultiplexer 610, received via the parity part block.

In this case, the decoder 630 is capable of receiving the regular (R) part of the composite sub channel via the first interleaver 620 and the parity (P) part of the composite sub channel directly from the demultiplexer 610. Alternatively, one (parity part data) of the data output from the first interleaver 620 and the data output from the demultiplexer 610 may be multiplexed by the multiplexer 640, and the multiplexed (selected) result may be input to the decoder 630.

The operation of the decoder 630 is similar to that of the decoder 330 illustrated in FIG. 4. The decoder 630 includes an inner decoder 631, a deinterleaver 633, an outer decoder 635, and a second interleaver 637.

The inner decoder 631 receives and decodes data $\lambda(c^i;I)$ from the first interleaver 620 and the demultiplexer 610 and feedback data $\lambda(u^i;I)$ from the second interleaver 637, and outputs the decoded result to the deinterleaver 633.

The deinterleaver 633 receives and decodes data $\lambda(u^i;O)$ from the inner decoder 631, and outputs the deinterleaved result.

The outer decoder 635 receives data $\lambda(c^o;I)$ from the deinterleaver 633 by upper entry of the outer decoder 635, and outputs information data $\lambda(u^o;O)$ and code data $\lambda(c^o;O)$. The outer decoder 635 receives data $\lambda(u^o;I)$ by its lower entry thereof. The value of the data $\lambda(u^o;I)$ is always set to 0.

The second interleaver 637 receives and interleaves the code data $\lambda(c^o;O)$ from the outer decoder 635, and outputs the interleaved result to the inner decoder 631.

The first and second interleavers 620 and 637 may be block interleavers, and the deinterleaver 633 may be a block deinterleaver.

The inner decoder 631 may be an inner SISO decoder and the outer decoder 635 may be an outer SISO decoder.

Figure 8:
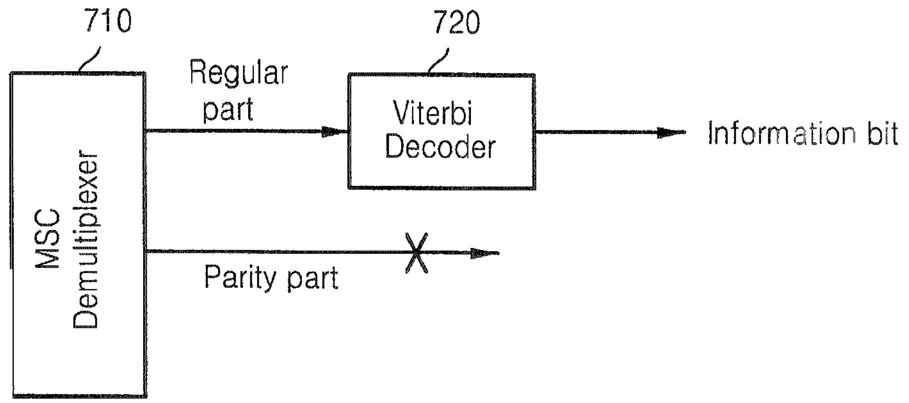
FIG. 8 is a block diagram of a receiving apparatus performing a method of receiving data from a multi-channel digital broadcasting system, according to an embodiment of the present invention.

FIG. 8 is a block diagram of a receiving apparatus, capable of performing a method of receiving data from a multi-channel digital broadcasting system according to an embodiment of the present invention.

The receiving apparatus includes a demultiplexer 710 and a Viterbi decoder 720. When the demultiplexer 710 selects data received via a composite sub channel of the multi-channel digital broadcasting system according to an embodiment of the present invention, a regular part of the composite sub channel may be decoded by the Viterbi decoder 720, since the construction of the sub channel block of FIG. 1 is the same as that of the regular (R) part block of FIGS. 5A and 5B. Here, a parity part of the composite sub channel is not used.

As described above, an apparatus and method for transmitting and receiving data for a multi-channel digital broadcasting system according to the present invention provide enhanced performance by using advanced coding schemes and are compatible with the existing digital broadcasting systems.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for transmitting information data in a multi-channel digital broadcasting system, comprising: a sub-channel generator configured to generate a first sub-channel based on the information data and a second sub-channel based on the information data; wherein the first sub-channel comprises:

- a regular part generated by a regular part block, based on the information data, wherein the regular part block comprises:
  - a first encoder configured to receive and encode the information data; and
  - a first interleaver configured to interleave the encoded information data;
- and wherein the second sub-channel comprises:
  - a parity part, generated by a parity part block, corresponding to the regular part, wherein the parity part block comprises:
    - a second interleaver configured to interleave the encoded information data from the first encoder;
    - a second encoder configured to receive and encode the interleaved information data from the second interleaver, and to output parity data based on the interleaved information data from the second interleaver.

2. The apparatus of claim 1, further comprising: a control channel generator configured to generate a fast information channel (FIC) containing information, about the first and second sub-channels, based on control data.

3. The apparatus of claim 1, wherein the sub-channel generator is a main service channel generator.

4. The apparatus of claim 1, wherein the sub-channel generator comprises:

the regular part block configured to generate the regular part; and the parity part block configured to generate the parity data based on the information data, and configured to generate the parity part based on the parity data.

5. The apparatus of claim 4, wherein the regular part block comprises:

a scrambler configured to scramble the information data supplied to the regular part block;

the first encoder configured to receive and encode the scrambled information data from the scrambler;

a first puncturing unit configured to puncture the encoded scrambled information data from the first encoder; and the first interleaver configured to interleave the punctured encoded scrambled information data from the first puncturing unit.

6. The apparatus of claim 5, wherein the parity part block further comprises:

a second puncturing unit configured to receive and puncture the encoded information data from the first encoder, and to output the puncturing result to the second interleaver; and a third puncturing unit configured to receive and puncture the parity data from the second encoder, and to output the puncturing result to a third interleaver; and the third interleaver configured to interleave the parity data from the second encoder.

7. The apparatus of claim 1, wherein the first encoder is a non-recursive, non-systematic convolutional encoder, and the second encoder is a recursive-systematic, convolutional encoder.

8. The apparatus of claim 1, wherein the second interleaver is a block-interleaver.

9. The apparatus of claim 1, wherein the second encoder is configured to receive and encode the data as input data from the second interleaver, and to output systematic data and parity data, and the parity part is generated based on the parity data excluding the systematic data.

10. The apparatus of claim 1, wherein the digital broadcasting system is a digital audio broadcasting system.

11. A method of transmitting data in an apparatus for transmitting information data in a multi-channel digital broadcasting system, comprising generating a first sub-channel based on the information data and a second sub-channel based on the information data, wherein the generating the first sub-channel comprises:

generating a regular part generated based on the information data, wherein generating the regular part comprises:

performing first encoding by encoding the information data; and performing first interleaving by interleaving the encoded information data; and wherein the generating the second sub-channel comprises:

generating parity data based on the information data, and generating a parity part based on the parity data, wherein generating the parity part comprises:

performing second interleaving by interleaving the information data encoded in the first encoding;

performing second encoding by encoding the information data interleaved in the second interleaving; and outputting the parity data based on the information data interleaved in the second interleaving.

12. The method of claim 11, further comprising:

generating a fast information channel containing information regarding the first and second sub-channels, based on control data; and multiplexing the first and second sub-channels and the fast information channel and transmitting the multiplexed result.

13. The method of claim 12, wherein the generating of the regular part comprises:

scrambling the information data supplied to the regular part;

performing the first encoding by receiving and encoding the scrambled information data;

performing first puncturing of the information data encoded in the first encoding; and performing the first interleaving by interleaving the punctured encoded information data.

14. The method of claim 13, wherein the generating of the parity part further comprises:

performing second puncturing by puncturing the information data encoded in the first encoding; and performing third puncturing by puncturing the parity data; and performing third interleaving by interleaving the punctured parity data.

* * * * *